United States Patent
Nigl

(10) Patent No.: US 12,275,178 B2
(45) Date of Patent: Apr. 15, 2025

(54) METHOD FOR OPERATING A DEVICE, COMPUTER PROGRAM PRODUCT AND DEVICE FOR PRODUCING A PRODUCT

(71) Applicant: ALPLA Werke Alwin Lehner GmbH & Co. KG, Hard (AT)

(72) Inventor: Christoph Nigl, Wolfurt (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 516 days.

(21) Appl. No.: 17/604,957

(22) PCT Filed: Apr. 28, 2020

(86) PCT No.: PCT/EP2020/061797
§ 371 (c)(1),
(2) Date: Oct. 19, 2021

(87) PCT Pub. No.: WO2020/221766
PCT Pub. Date: Nov. 5, 2020

(65) Prior Publication Data
US 2022/0176604 A1    Jun. 9, 2022

(30) Foreign Application Priority Data

Apr. 29, 2019 (CH) ..................... 00567/19

(51) Int. Cl.
*G05B 13/02* (2006.01)
*B29C 45/76* (2006.01)
(Continued)

(52) U.S. Cl.
CPC ............ *B29C 45/766* (2013.01); *B29C 49/78* (2013.01); *G05B 13/0265* (2013.01); *G05B 13/042* (2013.01); *B29C 2945/76949* (2013.01)

(58) Field of Classification Search
CPC ............. B29C 45/766; B29C 49/78; B29C 2945/76949; B29C 45/78; B29C 49/783;
(Continued)

(56) References Cited

U.S. PATENT DOCUMENTS 5,914,884 A * 6/1999 Gur Ali ................... B29C 45/76
                                                              700/47
7,896,636 B2    3/2011 Shioiri et al.
(Continued)

FOREIGN PATENT DOCUMENTS

| EP | 1 166 994 A1 | 1/2002 |
| WO | 90/09879 A1 | 9/1990 |
| WO | 2011023155 A1 | 3/2011 |

OTHER PUBLICATIONS

Schmidberger E. et al., "Neuronale Netze Beim Spritzgiessen. Öbeural Network in Injection Moulding", Kunststoffe, Carl Hanser Verlag, Munchen, Germany (May 1, 1995).
(Continued)

*Primary Examiner* — Christopher E. Everett
(74) *Attorney, Agent, or Firm* — Finch & Maloney PLLC

(57) ABSTRACT

A method for operating a device to produce a product includes capturing at least one quality data record that includes measured values of one or more quality parameters that each correspond to one property of the product. The method captures at least one associated machine data record including actual values of several adjustable machine parameters of the device, chronologically assigns the quality data record to the machine data record, and generates a first data record comprising chronologically-correlated measured values and actual values. The preceding steps are repeated at least once to generate at least one second data record. A correlation is determined between the quality parameter(s) and the machine parameter(s). The method provides a corresponding target value for at least one of the adjustable machine parameters on the basis of the control model, proceeding from a target value of the quality parameter(s).

19 Claims, 2 Drawing Sheets

Figure 1:
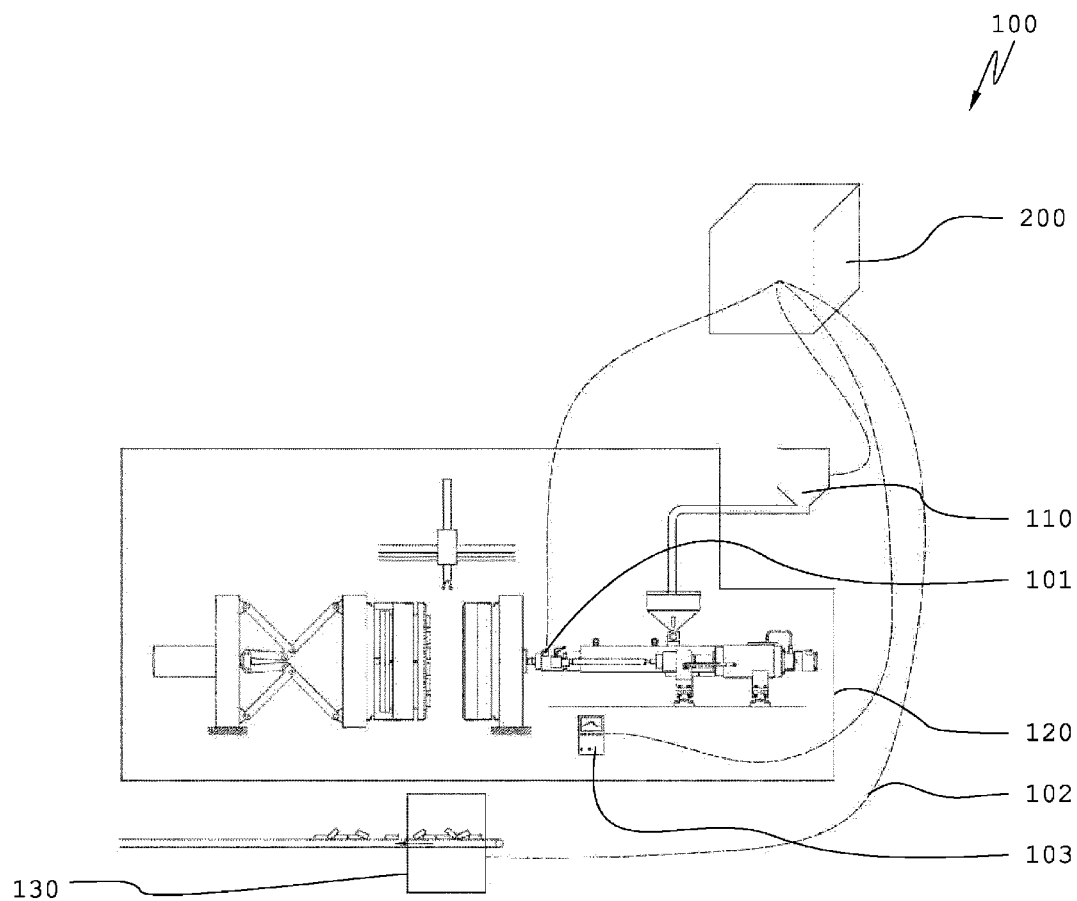

(51) Int. Cl.
*B29C 49/78* (2006.01)
*G05B 13/04* (2006.01)

(58) Field of Classification Search
CPC .... B29C 2049/7861; B29C 2049/7864; B29C 2049/78715; B29C 2945/7604; B29C 2945/76287; B29C 2945/76381; B29C 2945/76585; B29C 2945/76769; B29C 2945/76899; B29C 45/76; G05B 13/0265; G05B 13/042; G05D 27/02
See application file for complete search history.

(56) References Cited

U.S. PATENT DOCUMENTS

| | | | |
|---|---|---|---|
| 9,102,090 B2 | 8/2015 | Haesendonckx et al. | |
| 2002/0019674 A1* | 2/2002 | Liang | B29C 45/766 700/49 |
| 2002/0055806 A1 | 5/2002 | Brown | |
| 2006/0224540 A1* | 10/2006 | Shioiri | B29C 45/766 706/23 |
| 2012/0123583 A1* | 5/2012 | Hazen | G05B 15/02 700/109 |
| 2016/0274561 A1 | 9/2016 | Stone | |
| 2018/0181694 A1* | 6/2018 | Springer | B29C 45/766 |
| 2018/0281256 A1* | 10/2018 | Asaoka | G06N 20/00 |
| 2021/0247754 A1* | 8/2021 | Takahashi | B29C 45/76 |

OTHER PUBLICATIONS

European Patent Office, Written Opinion Of the International Search Authority, PCT Application No. PCT/EP2020/061797 (Mailed Jun. 10, 2020).

European Patent Office, International Search Report, PCT Application No. PCT/EP2020/061797 (Mailed Jun. 10, 2020).

Chinese Intellectual Property Ofice, Office Action issued in Chinese patent application No. 202080031860.5 (Sep. 1, 2023).

* cited by examiner

METHOD FOR OPERATING A DEVICE, COMPUTER PROGRAM PRODUCT AND DEVICE FOR PRODUCING A PRODUCT

The present invention relates to a method for operating a device for producing a product—in particular, a device for molding a hollow body or an injection-molded part—a computer program product, and a device for producing a product according to the preamble of the independent claims.

Different methods for operating a device for producing a product are known from the prior art. Typically, while operating a device for producing a product, numerous parameters are set on the device prior to the actual production process. During the production process, these parameters can change, whether by manual adjustment/readjustment or because properties of the device itself change over the course of the process. For example, the behavior of a device changes depending upon the environment in which it is operated, or which material is processed in the device. External parameters, such as room temperature or external temperature or humidity, have an influence on the device. Properties of the device itself can also change. For example, a device can heat up during the production process, which causes, for example, certain parts of the device to change in length, or equipment such as hydraulic oil or the like to have a changing viscosity over the course of operation. All these changes have an influence on the product to be produced. It is therefore necessary to continuously control the properties of the products. In certain processes, it is sufficient if, for example, every 100th product is tested; other processes render it necessary for each individual product to be tested.

Such testing processes are complex and expensive. In addition, not all products can be tested non-destructively.

WO 2011/023155 A1 discloses a method for blow-molding containers in which, based upon measured parameters characterizing the blow-molding process, at least one property of the fully-blown container is calculated and compared with a target value. Based upon a determined deviation, the parameter influencing the blow-molding process is changed. The relevant simulations are to be performed with expert knowledge.

This known method is demanding and inaccurate. The provision of expert knowledge requires a great deal of effort and is based upon subjective judgment.

It is an aim of the invention to overcome one or more disadvantages of the prior art. In particular, a method and an device shall be provided which make it possible to substantially operate devices for producing products automatically, and to produce products of very constant quality, and, in particular, to reduce the effort required for checking the products produced.

This aim is achieved by the devices and methods defined in the independent claims. Further embodiments are the subject matter of the dependent claims.

A method according to the invention for operating a device for producing a product—especially, a method for operating a device for molding a hollow body or an injection-molded part—comprises the steps of:
- capturing at least one quality data record comprising measured values of one or more quality parameters, each corresponding to a property of the product;
- capturing at least one associated machine data record comprising actual values of several—in particular, all—adjustable machine parameters of the device;
- chronologically assigning the quality data record to the machine data record and generating a first data record comprising chronologically-correlated measured values and actual values;
- repeating the preceding steps at least once to generate at least one second data record;
- determining a correlation between the quality parameter(s) and the machine parameter(s) by comparing the captured data records and creating a control model for the device, and
- providing a corresponding target value for at least one of the adjustable machine parameters on the basis of the control model, proceeding from a target value of the quality parameter(s).

The quality parameters of the product can, for example, be the material distribution in the finished product, the contour of the finished product, wall thicknesses of the finished product, the weight of the finished product, the temperature distribution of the directly-demolded product, or the color and surface condition of the finished product.

The product can also be an intermediate product. Accordingly, the quality parameter corresponding to a property of the product can also be a parameter of the intermediate product, e.g., the temperature of a plastic melt, or a diameter of a tube preform during extrusion blow molding.

All of these quality parameters are generally captured by means of suitable sensors and made available as measured values—in particular, automatically. However, it is also possible for quality parameters such as the color or surface condition, which, for example, may be indicators of surface quality, to be assessed by a machine operator, and for their quantities to be communicated to the system as measured values by manual inputs.

The machine parameters of the device can, for example, be the temperature of a tool, the temperature of a corresponding operating material such as hydraulic oil, or compressed air, or cooling water and the like, or, in the case, for example, of a blow-molding machine, the temperature of a molding tool, the volume of a blown gas flow or its temperature, parameters of the stretching curve such as the stretching speed, temperatures of a preform, a corresponding melt pressure in a corresponding cavity, the speed of a conveying screw, the volume, type, or shape and temperature of starting material, such as plastic granules being conveyed. Likewise, the static charge of the machine or of the supplied plastic granules can be captured as the machine parameter, for example. It goes without saying that not all of the machine parameters mentioned here can be adjusted directly. For example, the shape of the granules can be changed only by exchanging the supplied granules. It can therefore be provided that, together with adjustable machine parameters, non-adjustable machine parameters also be captured.

All of these machine parameters can, in particular, be captured or read out by measuring and made available as actual values. Several machine parameters are, preferably, captured simultaneously and provided in a machine data record.

In the present case, an associated machine data record is a data record of the device with which the product from which the quality parameter originates is produced.

In the acquisition of a quality data record, several measured values of a quality parameter of a product are included. Preferably, several measured values of several quality parameters are captured simultaneously and provided in one quality data record.

In the acquisition of a machine data record, several actual values of a corresponding machine parameter are included. These can map a temporal course of the corresponding actual value.

The machine data record is chronologically assigned to the quality data record, i.e., linked thereto, and a data record is generated which contains both measured values and actual values. Preferably, the machine data record is assigned to that machine data record that was relevant to the production of the product or of a precursor, and therefore to the associated quality parameters.

In principle, it is not necessary to always capture all quality parameters at a certain point in time; for example, the weight of the finished product could always be recorded, while, for example, the surface quality is recorded only for every tenth product. By comparing several such data records, a correlation between the quality parameter or the quality parameters and the machine parameter or the machine parameters can be determined. These correlations can be both causal relationships and indirect correlations which are linked to one another via a third quantity, for example.

The provision of a target value of at least one machine parameter on the basis of the determined correlation, proceeding from a target value of one quality parameter or several quality parameters, makes it possible to precisely control a device for producing a product. In particular, checking the product after its production can become superfluous since, by previously detecting the relationships between quality parameters and machine parameters, i.e., determining the correlation between the respective machine parameters and quality parameters, and by correspondingly adjusting the machine parameters, the result, i.e., the target value of the quality parameter to be achieved, is predictable.

A plurality of target values of machine parameters is, preferably, provided, proceeding from a target value of a quality parameter, such as a wall thickness of a blown body. Preferably, all target values of the machine parameters which can be influenced by controlling and/or regulating are provided.

It may also be provided that correlations between the actual values of several machine parameters be determined, since it is conceivable that several machine parameters likewise influence each other.

This makes it possible to predict the extent to which changing one machine parameter affects a different machine parameter, and, subsequently, also the extent to which a quality parameter may change.

In addition, at least one environmental data record can be captured. The environmental data record comprises measured values of one or, in particular, several environmental parameters or environmental parameters. This environmental data record is chronologically assigned to the machine data record and therefore forms part of the respective captured data records.

With the acquisition of an environmental data record, it is possible to additionally capture the influence of the environmental conditions on the corresponding quality parameter and to include it in the correlation, and therefore, in particular, expand the control model by one or more boundary conditions.

The environmental parameters may comprise parameters such as air temperature or humidity, or also air pressure, the time of day (in particular, day or night), the geographic position of the machine and/or the plant in which the machine is operated (and, accordingly, the associated climatic conditions), or parameters about the status of the factory building in which the machine is located, e.g., open or closed gates or windows, which can, for example, predict something about the air movement, such as a draft.

For example, during a blowing process, the air temperature of the environment can have an influence on the cooling rate of the product, which in turn can possibly have an influence on a corresponding wall thickness of the product if, for example, the material solidifies more slowly at certain locations.

It goes without saying that several different combinations of target values of machine parameters can be suitable for achieving a certain target value of a quality parameter.

Depending upon the boundary conditions such as the ambient temperature, one or more machine parameters must be set differently. These relationships are captured by determining the correlations between the measured values and actual values and, in the event that an environmental parameter is a boundary condition, the measured values of the environmental parameters. These relationships are subsequently provided in a control model.

The data records can be determined at least once on the basis of test results from the device for producing a product, and are provided for creating the control model for the device.

This makes it possible to provide data records in a specific form. It is therefore conceivable for individual machine parameters to be kept constant over a certain period of time, and for other machine parameters to be varied over this period of time. During this time period, one or more quality parameters of the product can be measured, and, accordingly, the measured values of the quality parameters and the corresponding actual values of the machine parameters can be converted into corresponding quality data records or machine data records.

Additionally or alternatively, it can be provided that a plurality of measured values and actual values from production plants with devices for producing products be collected and made available in a database, for example. A plurality of quality data records and machine data records can be created from these measured values and actual values, and a plurality of data records can in turn be generated therefrom. By comparing this plurality of data records, the determination of correlations is simplified, and the corresponding correlations are more precise. This enables the creation of a more precise control model.

The data records can therefore be determined by collecting a plurality of measured values and actual values from production plants, and provided for creating the control model for the device.

The method steps, as described herein, essentially correspond to a learning phase.

This learning phase results in a very tight link between the machine parameters, quality parameters, and environmental parameters, which in turn yields a very precise model of the relationships, which in turn yields a very precise control model.

The provision of a target value for at least one machine parameter described in this method can occur after this learning phase.

The provision of the aforementioned target value or several target values for machine parameters can occur in the form of a transfer of these values to a controller of a corresponding device for producing a product, e.g., automatically or manually. The controller may be part of a computer and comprise one or more computer program products. Following the transfer, the device for producing a product can be operated according to these specifications and carry out an appropriate production process or manufacturing process.

It can be provided that actual values of several of the machine parameters and at least one of the environmental parameters be captured and, proceeding from these actual values, the values of the quality parameter(s) corresponding to these actual values be output using the control model. These value(s) are compared with the target value(s) of the quality parameter(s), and a deviation is determined. Proceeding from this deviation, the device is then controlled—in particular, regulated—using the control model—in particular, taking into account the actual value of the at least one environmental parameter.

Alternatively or additionally, it can be provided that the actual values of the machine parameters be compared with the respective target value. The device can be controlled—in particular, regulated—on the basis of a deviation of the actual value of the machine parameter from the corresponding target value.

In this case, it can be provided that only the actual values of the machine parameters and/or the environmental parameters be captured when controlling the device. This means that the quality parameters are not captured. These automatically turn out to be correct if the actual values of the machine parameters correspond to the target values of the machine parameters.

In this case, it can be provided that a respective value of a machine parameter, such as the speed at which a form is opened or closed, be directly influenced. Other machine parameters cannot be directly regulated. This concerns, for example, the viscosity of an equipment. However, by means of suitable cooling devices, it is possible, for example, to influence the temperature, which in turn has an effect on the viscosity. This effect in turn can be derived from one of the predetermined correlations.

In addition, there may be parameters that cannot, practically, be influenced, such as environmental parameters, which can by their very nature hardly be changed. In order to compensate for their deviations from a desired value, correspondingly correlating machine parameters may be controlled or regulated.

A deviation of the actual value from the corresponding target value of the respective machine parameter means that the corresponding target value of the quality parameter, on the basis of which the target value of the machine parameter was determined, also deviates. Controlling or regulating the corresponding machine parameter, or, if applicable, one or more machine parameters which have a corresponding influence on and/or correlate with this machine parameter, therefore makes it possible to achieve the corresponding target value of the quality parameter.

The respective actual value of the machine parameters and of the at least one environmental parameter can be captured continuously while the device is operating.

This allows the quality parameter to be continuously monitored.

Alternatively, it can be provided that the actual values of the respective machine parameters and of the at least one environmental parameter be captured at predeterminable time intervals (cyclically) while the device is operating.

This can be advantageous, in particular, for parameters that change only slowly or have only a very small influence on the quality parameters. In this way, the amount of data and the effort required to capture the respective machine parameter can be reduced.

In a preferred form of the method, the correlations, i.e., the control model, are transferred to the device only once. Given the very tight linkage of machine parameters, quality parameters, and environmental parameters, a conclusion can be drawn about the quality parameter when the machine parameter is set, or when the machine parameters are set, without the quality parameter having to be re-measured. In other words, the device can be adjusted to the quality parameter to be achieved, and the device selects the respective machine parameters according to the control model. As soon as the measured machine parameters, i.e., the actual values, coincide with the selected machine parameters, i.e., the target values, it can be assumed that the actual value of the quality parameter corresponds to the selected target value of the quality parameter.

The present invention therefore also relates to the operation of a device—in particular, a method for operating a device—for producing a product—in particular, a device for molding a hollow body or an injection-molded part—wherein, in this device, the correlations obtained in a learning phase using the method described herein are stored statically—in particular, as a static control model. In doing so, the corresponding target values of the machine parameters are selected and set, proceeding from a desired target value of a quality parameter.

However, it may also be provided that the target parameter be input into an external database, and the target parameters be fed into the device from the external database. This can be done manually by means of input by a machine operator, for example. An automatic transfer, e.g., via an electronic interface, is also possible.

It may be provided that an actual value of at least one of the quality parameters be compared cyclically with the target value of the quality parameter.

These comparisons are particularly advantageous when the device is operated to produce a product in test mode—in other words, during the learning phase. These comparisons can be used to determine whether the correlations that were determined coincide with practice, and/or to obtain further measured values.

Preferably, the control model can be determined according to the correlation or correlations between the quality parameter(s) and the machine parameter(s), taking into account the at least one quality parameter, by means of machine learning. In particular, the correlation or the correlations can be determined by means of an implementation of artificial intelligence—in particular, with a neural network.

This allows the determination and recognition of relationships, i.e., correlations, regardless of whether there is a direct or causal relationship between individual measured values and actual values. By using machine learning, wide-ranging and/or higher-level patterns of a plurality of individual measured values and actual values can be detected, and/or compared to one another, and/or linked to one another.

The machine data record may comprise several machine parameters—in particular, actual values of several machine parameters. In this case, to each machine parameter, a weighting of its influence on each quality parameter can be assigned according to its correlation with the one or more quality parameters of the quality data record. The control model therefore involves a weighting of the individual machine parameters.

This means that the greater or better the correlation between a machine parameter and a quality parameter, the greater the influence of a change in a corresponding machine parameter on the respective quality parameter. Accordingly, it can be provided that a correspondingly high weighting be assigned to such a machine parameter, i.e., the corresponding correlation between the respective quality parameter and the respective machine parameter.

However, if this machine parameter has, for example, an influence on a further quality parameter of the product, which may, for example, also be negative, it may be provided for a somewhat lower weighting to be assigned to this machine parameter. This means that the machine parameter with the greatest influence on a respective quality parameter is not necessarily the machine parameter with the highest weighting. The highest weighting can, for example, have a machine parameter which, although it has a correspondingly large influence on a specific quality parameter of the product, simultaneously has a very small influence on other quality parameters and/or also on other machine parameters.

It may also be provided that several weightings, e.g., with regard to a rapid change and with regard to the lowest possible influence on other machine or quality parameters, be determined.

In order to achieve the target value of one or more of the quality parameters, one or more of the respective machine parameters may be controlled or regulated with the respective weighting with respect to the quality parameter(s) according to the control model.

Precise intervention and precise control or regulation are, accordingly, made possible.

In addition, it may be checked whether one or more of the actual values of the machine or environmental parameters captured while controlling the device lie within a value range of the machine parameters captured in the creation of the control model and/or the captured environmental parameters.

If, for example, the ambient temperature was captured as one of the environmental parameters to create the control model, there is typically a highest captured value and a lowest captured value. The lowest value indicates the lower limit of the value range, and the highest value indicates the upper limit. The value range in which the environmental parameter was captured can therefore extend, for example, from 15° to 30°. For actual values outside of this value range, there are no longer any values in the control model based upon measured data.

In the event that one or more of the actual values of the machine or environmental parameters captured while controlling the device are outside the range of values, it may be checked whether the deviation of the respective actual values occurs once or repeatedly—in particular, within a certain time period—and that an error signal can be output if the respective deviation occurs repeatedly.

This makes it possible to inform the machine operator or a higher-level controller that the method parameters are outside a range secured by measurements. However, the error message can also be considered an indication that a measuring sensor or measuring sensor is defective.

Additionally or alternatively, in the event that one or more of the actual values of the machine or environmental parameters captured while controlling the device are outside the value range, it can be checked whether the deviation from the value range is significant. If the deviation is significant, an error signal can be output.

This prevents a correspondingly unnecessary error signal from being output even in the event of deviations from the value range that have little to no influence on the quality parameter.

A significant deviation can exist if either the deviating actual value relates to a machine parameter which is regulated with a high weighting to the target value of one or more quality parameters, or if the deviation has exceeded an—in particular, adjustable—threshold value.

It can be provided that the control model switch off the device, or at least request manual control interventions, if the check has revealed that the deviation is significant or repeatedly occurs.

This prevents an excessive production of products with deviating quality parameters, and/or requires at least a corresponding inspection and instruction of an operator.

A further aspect of the invention relates to a computer program product. The computer program product comprises commands which, when run on a computer, cause it to execute the steps of the method described herein.

This allows the method described herein to be implemented in a control and/or regulation system of a device for producing a product.

A further aspect of the invention relates to a device for producing a product. This device is, in particular, a device for molding a hollow body. The device comprises a computer program product as described herein.

This makes it possible to provide a device for producing a product in which both a learning process/phase and a production process/phase can be carried out. In other words, a device designed according to the invention makes it possible to determine all correlations between the device itself and the product to be produced, and, further, makes it possible to dispense with a comprehensive check in the subsequent production process of the particular products that are made.

The device according to the invention may be a component of a device for injection molding or for blow molding. For example, the device is an extruder, a dryer for starting material for producing the product, an extrusion blowing device, or a stretching blowing device.

The invention will be explained in more detail below with reference to schematic figures, which show only exemplary embodiments. The following are shown:

FIG. 1: a schematic representation of a device for producing a product

Figure 2:
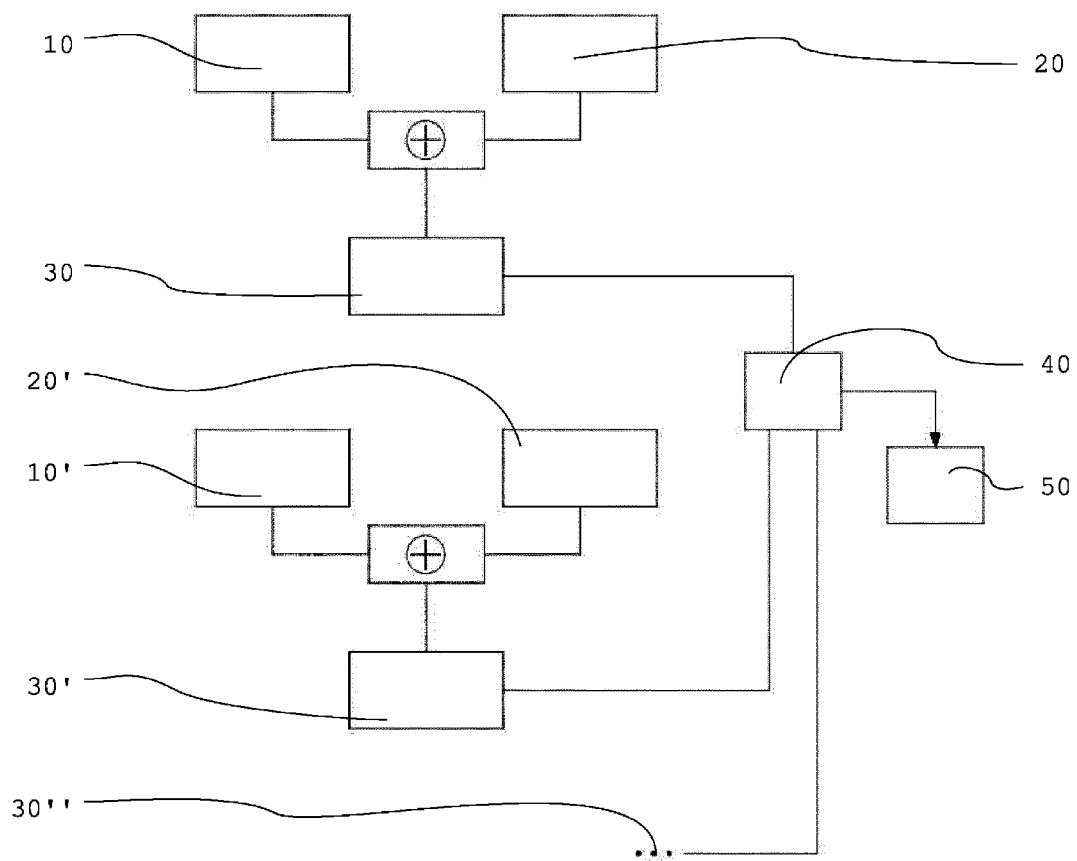

FIG. 2: a flowchart of a method according to the invention

FIG. 1 shows a simplified schematic representation of a device for producing a product which, in the present case, is designed as, for example, a blow-molding machine 100. The blow-molding machine 100 has an infeed 110, a blow-molding region 120, and a discharge 130. Preforms are fed to the blow-molding machine in a known manner by means of the infeed 120. In the blow-molding region 120, these are inflated with compressed air and are thereby stretched with the aid of a rod. In the discharge 130, the completely inflated containers are collected and/or removed. This production process as such is known and will therefore not be explained in more detail here.

FIG. 1 also shows a controller 200. Via connections 102 indicated here by dashed lines, the controller 200 is connected to sensors arranged on the blow-molding machine 100. The controller 200 may be designed as a separate unit, but is generally an integral part of the device. The sensors may be temperature sensors, clock generators, position sensors, and the like. Actual values of machine parameters can be captured with the sensors. The sensors in this case are only schematically indicated. A temperature sensor 101 is shown as a placeholder for a plurality of sensors.

In the shown exemplary embodiment, the connections 102 between the controller 200 and the blow-molding machine are wired via cables. However, these connections can also be implemented wirelessly or via fiber-optic cables.

Furthermore, FIG. 1 shows a human-machine interface (HMI unit), i.e., an operating unit 103. Via this operating unit 103, a machine operator can monitor the device and, for example, specify a target value of a quality parameter.

FIG. 2 shows a schematic process of a method for operating a device for producing a product, e.g., a method for operating the blow-molding machine 100 from FIG. 1.

In a first step, a quality data record 10 is captured. The quality data record 10 comprises, for example, several measured values of wall thicknesses of a container.

In a second step, a machine data record 20 is captured. The machine data record 20 comprises actual values of the temperature sensor 101 (see FIG. 1).

The quality data record 10 and the machine data record 20 have been captured simultaneously. Accordingly, the quality data record 10 can be chronologically assigned to the machine data record 20, and a data record 30 can be formed. Within the data record 30, the measured values and the actual values are correlated chronologically.

This temporal correlation will be explained in more detail with reference to the following simplified example. At the point in time t1, for example, the wall thickness D1 of a first container B1 in the discharge 130 (see FIG. 1) is measured. The wall thickness D1 corresponds to a quality parameter. At the same time, the temperature K1 of the cavity in which a second container B2 is inflated at the same point in time t1 is measured in the blow-molding region 120 (see FIG. 1). The temperature K1 corresponds to a machine parameter. The temperature V1 of a preform of a third container B3 in the infeed 110 (see FIG. 1) is again measured simultaneously. This temperature V1 can be treated as a machine parameter or as a quality parameter. In the present example, the temperature V1 is treated as a machine parameter.

In a next step, all containers B1, B2, and B3 are moved one station further. That is, the preform of the third container B3 is moved further from the infeed 110 into the blow-molding region 120, and the inflated second container B2 is moved further from the blow-molding region 120 into the discharge region 130, while the first container B1 is removed from the discharge region 130. A new preform of a fourth container B4 is provided in the supply line 110.

At the point in time t2, the wall thickness D2 of the container B2 is measured. The preform of the container B3 is located in the cavity for inflating the container B3, wherein the temperature K2 is measured. At the same time, the temperature V2 of the new preform of a container B4 is re-measured. These processes are now repeated for the other containers B2, B3 through Bn.

That is, the temperature K1 of the container B2 is measured at time t1, but the effect of this temperature K1 on the wall thickness D2 of the container B2 is measured only at time t2. In other words, for a measured value of a quality parameter—in this example, D2—there are a plurality of actual values that lie at different intervals in time before the point in time at which the measured value of the quality parameter is captured. These temporal correlations are created in the data record 30.

Following the creation of the data record 30, a second data record 30' is created. This comprises capturing a second machine data record 20', capturing a second quality data record 10', and accordingly generating a data record 30' as described above.

The quality data records 10 and 10' may comprise further quality parameters, which are preferably all captured simultaneously. Therefore, a further quality parameter in addition to the wall thickness can, for example, be the opacity of a wall of the container, or the concentricity of a closure relative to a container bottom.

The machine data records 20 and 20' can also have measured values of further machine parameters.

In the next step, the data records 30 and 30' are merged, and a correlation 40 between the measured values and the actual values is determined.

On the basis of these correlations, a target value 50 of the captured machine parameter, or, when there are several machine parameters in the respective machine data records 20, 20', target values 50 for each captured machine parameter, can be determined for each target value of a quality parameter. As already stated, there may be several combinations of target values 50 of the machine parameters which lead to the same target value of the quality parameter. In the event that, for example, a machine parameter is invariable (or, if applicable, an invariable environmental parameter is included in the method), the target values must be determined on the basis of two fixed values (target value of the quality parameter and invariable value of the device/environment), which reduces the possible combinations. These relationships are stored in a control model for the device, or a control model for the device is created on the basis of these relationships.

Since a plurality of data records 30, 30', represented as data records 30", is, usefully, generated, machine learning is used to determine the correlations 40. This makes it possible to compare a plurality of values with one another and to determine similarities or patterns and the like, and link them to one another, even if the relationships are no longer obvious.

In a subsequent step of the method, a target value of the quality parameter is selected, and corresponding target values 50 of machine parameters are transmitted to the controller 200 (see FIG. 1) in order to correspondingly operate the blow-molding machine 100 (see FIG. 1). In doing so, the control model, or only the corresponding values of the machine parameters that were determined using the control model, can be transmitted to the control unit. As soon as the measured actual values of the blow-molding machine 100 (see FIG. 1) deviate from the target values 50, the control system can readjust them. Should, for example, values change on which the control system cannot exert any influence (for example, the outside temperature), the target values 50 can be adapted in accordance with a specification for the corresponding non-influenceable value. For this purpose, the target values 50 are anchored in a data matrix—in particular, in a control model—which has been transmitted to the control 200 as part of the target value 50 of the quality parameter (see FIG. 1).

The invention claimed is:

1. A method for operating a blow molding device to produce a molded component, the method comprising a learning phase and a production phase, that makes it possible to dispense with a check in the subsequent production process of the particular products that are made:
    providing the blow molding device with a controller and having a volume V and one or more adjustable machine parameters including temperature T and pressure P;
    the learning phase comprising the steps of:
        capturing, by the controller at least one quality data record comprising measured values of one or more quality parameters that each correspond to a physical property of the molded component;

capturing, by the controller, at least one associated machine data record comprising actual values of the one or more adjustable machine parameters of the blow molding device;

chronologically assigning, by the controller, the quality data record to the machine data record and generating a first data record comprising chronologically-correlated measured values and actual values;

repeating the preceding steps at least once to generate at least one second data record;

determining, by the controller, a correlation between the one or more quality parameters and the one or more adjustable machine parameters by comparing the captured first and second data records; and creating a control model for the blow molding device based on the correlation; and the production phase comprising the steps of:

providing, by the controller, a corresponding target value for at least one of the one or more adjustable machine parameters using the control model, proceeding from a target value of the one or more quality parameters;

comparing, by the controller, the actual values of the one or more adjustable machine parameters with the respective corresponding target value; and controlling, by the controller, the blow molding device based on a deviation of the actual value of the one or more adjustable machine parameters from the respective corresponding target value.

2. The method according to claim 1, further comprising:
capturing, by the controller, at least one environmental data record comprising measured values of one or more environmental parameters; and assigning the measured values of the one or more environmental parameters chronologically to the machine data record in order to therefore form a part of the respective captured first and second data records.

3. The method according to claim 2, further comprising:
capturing actual values of the one or more adjustable machine parameters and at least one of the one or more environmental parameters;

proceeding from the actual value and using the control model, outputting the measured values of the one or more quality parameters corresponding to the actual value;

comparing the actual values with the target value(s) of the quality parameter(s);

determining a deviation; and controlling the device by proceeding from the deviation and based at least in part on the actual value of the at least one environmental parameter.

4. The method according to claim 3, wherein capturing the actual values of the one or more adjustable machine parameters and of the at least one environmental parameters is performed continuously while the blow molding device is operating.

5. The method according to claim 3 wherein capturing the actual values of the one or more adjustable machine parameters and of the at least one environmental parameters is performed cyclically while the blow molding device is operating.

6. The method according to claim 3, further comprising:
determining whether one or more of the actual values of the one or more adjustable machine parameters or the at least one environmental parameters captured while controlling is within a value range of the one or more adjustable machine parameters captured in the creation of the control model and/or the captured at least one environmental parameters.

7. The method according to claim 6, comprising:
determining that one or more of the actual values is outside the value range;

determining that a deviation of the actual values repeatedly occurs; and outputting an error signal.

8. The method according to claim 6, comprising:
determining that one or more of the actual values is outside the value range;

determining that a deviation from the value range is significant for the control model; and outputting an error signal.

9. The method according to claim 8, wherein the deviation is significant if either (i) the deviating actual value relates to one or more adjustable machine parameter which is regulated with a high weighting to the target value of one or more quality parameters, or (ii) if the deviation has exceeded a predetermined threshold value.

10. The method according to claim 9, comprising:
determining that the deviation is significant or repeatedly occurs; and switching off the blow molding device, or requesting manual control interventions.

11. The method according to claim 1, comprising:
capturing, by the controller, test results during operation of the blow molding device to produce the molded component;

wherein creating the control model for the blow molding device is performed based on the test results; and wherein capturing the at least one quality data record and capturing the at least one associated machine data record are performed at least once on the basis of the test results.

12. The method according to claim 1, wherein the first and second data records are determined by collecting a plurality of chronologically-correlated measured values and actual values from production plants and wherein creating the control model for the device uses the collected chronologically-correlated measured values and actual values.

13. The method according to claim 1, wherein determining the control model is performed according to the correlation between the one or more quality parameters and the one or more adjustable machine parameters, taking into account the at least one of the one or more quality parameters by means of machine learning.

14. The method according to claim 1, wherein the machine data record comprises a plurality of adjustable machine parameters, and the method comprises assigning a weighting of an influence of each one of the plurality of adjustable machine parameters on each of the one or more quality parameters to each of the one or more adjustable machine parameters according to the correlation with the one or more quality parameters of the quality data record.

15. The method according to claim 14, further comprising:
regulating at least one of the one or more of the respective adjustable machine parameters with the respective weighting with respect to the one or more quality parameter(s) according to the control model.

16. A computer program product comprising commands which, when run on a computer, cause the device to execute the steps of the method according to claim 1.

17. A device for molding a hollow body, comprising a computer program product according to claim 16.

18. The device according to claim 17, wherein the device is a component of a device configured for one or more of (i) injection molding or for blow molding, (ii) a dryer for starting material for the production of the product, (iii) an extrusion blowing device, or (iv) a stretching blowing device.

19. The device according to claim 18, wherein the device is an extruder.

* * * * *